United States Patent [19]

Shine

[11] Patent Number: 5,046,689

[45] Date of Patent: Sep. 10, 1991

[54] COWLING INTERLOCK SYSTEM

[75] Inventor: Paul R. Shine, Bellevue, Wash.

[73] Assignee: The Boeing Company, Seattle, Wash.

[21] Appl. No.: 340,275

[22] Filed: Apr. 19, 1989

[51] Int. Cl.$^5$ .......................... B64C 1/14; B64C 1/16
[52] U.S. Cl. ............................... 244/129.4; 244/53 R; 244/129.5; 60/39.31
[58] Field of Search ............... 244/129.4, 129.5, 53 R; 60/226.2, 39.31; 49/367, 368

[56] References Cited

U.S. PATENT DOCUMENTS

| 3,541,794 | 11/1970 | Johnston et al. | 60/226.2 |
| 4,583,324 | 4/1986 | Storz et al. | 49/367 |
| 4,585,189 | 4/1986 | Buxton | 244/54 |
| 4,629,146 | 12/1986 | Lymons | 244/129.4 |

FOREIGN PATENT DOCUMENTS 2095333 9/1982 United Kingdom ............. 244/129.5

Primary Examiner—Joseph F. Peters, Jr.
Assistant Examiner—Anne E. Bidwell
Attorney, Agent, or Firm—Christensen, O'Connor, Johnson & Kindness

[57] ABSTRACT

An aircraft engine cowling interlock system (10) for sequencing the closure of adjacent overlapping cowlings. The cowling interlock system (10) includes a telescoping rod (22) that holds an overlapping thrust reverser cowling (12) in an open position; a locking mechanism (24) that locks the telescoping rod (22) and the thrust reverser cowling (12) in the open position; and a connecting assembly (26) that connects the locking mechanism (24) to an overlapped core cowling (14), such that the locking mechanism (24) locks the telescoping rod (22) in the open position when the core cowling (14) is in an open postion to prevent closure of the thrust reverser cowling (12), and the locking mechanism (24) unlocks the telescoping rod (22) when the core cowling (14) is in a closed position to allow closure of the thrust reverser cowling (12).

9 Claims, 3 Drawing Sheets

COWLING INTERLOCK SYSTEM

TECHNICAL AREA

This invention relates to aircraft engine cowlings and, more particularly, to a cowling interlock system for sequencing the closure of adjacent overlapping cowlings.

BACKGROUND OF THE INVENTION

Aircraft cowling systems for large jet engines typically include an inlet cowling, a fan cowling, a thrust reverser cowling, and a core cowling. These cowlings are usually hinged to move between a closed position and an open position. This allows access to the engine or the cowlings in order to perform inspections and maintenance.

Because adjacent cowlings are frequently constructed to have overlapping widths, there will be contact between the cowlings when they are opened and closed out of sequence. Overlap between adjacent cowlings also occurs because the cowlings pivot about axes that are not parallel, resulting in interference between the cowlings when they are moved to the closed position. This occurs most frequently between the thrust reverser cowling and the core cowling. As a result, it is imperative that these cowlings be closed in the proper sequence in order to prevent structural damage to the cowlings and the hinge mechanisms.

While there are a number of prior art devices that enable cowlings to be opened and closed, or to be locked in an open position, these devices do not ensure that adjacent overlapping cowlings are closed in the proper sequence to avoid contact. Proposed mechanisms for sequencing the movement of adjacent overlapping cowlings have been rejected due to complexity, cost, and installation difficulties. For instance, one system uses hydraulic interlock valves, hydraulic lines, hose assemblies and various mounting brackets and supports. This requires installation of hydraulic lines on the fan case and mounting of hydraulic valves in a location that maintains a normal environmental temperature of $-30°$ F. to $+350°$ F. This results in additional complexity, weight, and maintenance difficulties. This invention is directed to overcoming these disadvantages.

SUMMARY OF THE INVENTION

In accordance with this invention, an aircraft engine cowling interlock system for sequencing the closure of adjacent overlapping cowlings is disclosed. In the typical environment in which the cowling interlock system would be applied, a first cowling and an adjacent second cowling each are mounted to an engine for movement between an open position and a closed position. The first cowling overlaps the second cowling when both cowlings are in the closed position. The cowling interlock system includes a telescoping rod, a latch, and a connecting assembly. The telescoping rod has a first end attached to the first cowling and a second end attached to the engine frame; it is operable between an extended configuration wherein the first cowling is held in the open position, and a retracted configuration wherein the first cowling is in the closed position. The latch functions to selectively lock the telescoping rod in the extended configuration. The connecting assembly operatively connects the latch to the second cowling such that the latch locks the telescoping rod in the extended configuration to prevent closure of the first cowling when the second cowling is in the open position, and the latch unlocks the telescoping rod when the second cowling is in the closed position to permit closure of the first cowling.

In accordance with another aspect of the present invention, the connecting assembly includes a cable having a first end attached to the latch and a second end attached to the second cowling. The invention further includes a spring for biasing the latch into engagement with the telescoping rod as the second cowling moves to the open position to provide slack in the cable.

As will be readily appreciated from the foregoing description, a cowling interlock system formed in accordance with the invention ensures the proper closing sequence of any adjacent overlapping cowlings, particularly a thrust reverser cowling that overlaps an adjacent core cowling. By connecting the latch on the telescoping rod to the pivoting end of the core cowling, the thrust reverser cowling will be locked in the open position when the core cowling is in the open position. Thus, the cowling interlock system prevents the cowling structural damage that can occur when an attempt is made to close cowlings out of sequence.

BRIEF DESCRIPTION OF THE DRAWINGS

The foregoing and other features and advantages of the present invention will become more readily appreciated as the same becomes better understood by reference to the following detailed description of a preferred embodiment of the invention and the accompanying drawings wherein.

DESCRIPTION OF THE PREFERRED EMBODIMENT

Figure 1:
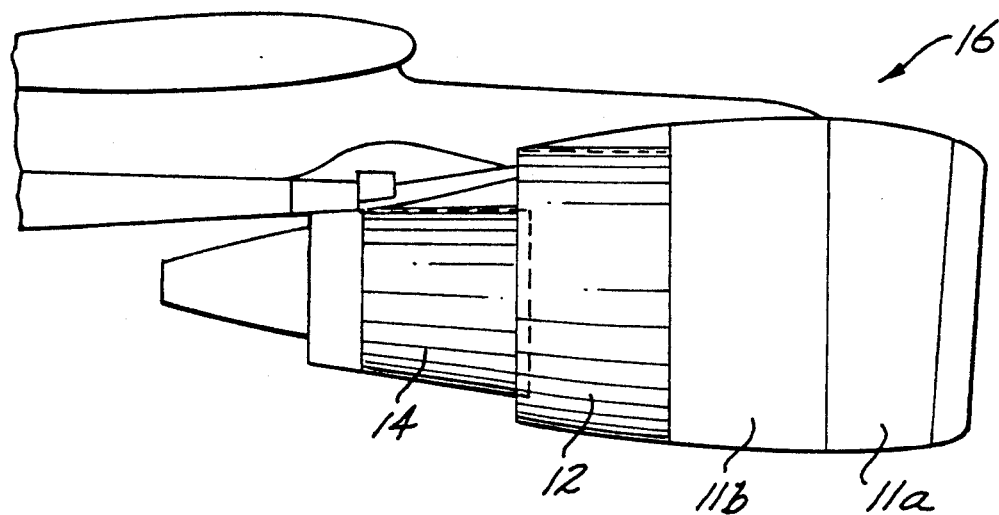
FIG. 1 is a side view of an aircraft engine cowling arrangement in which the cowling interlock system formed in accordance with the invention finds application.
Figure 2:
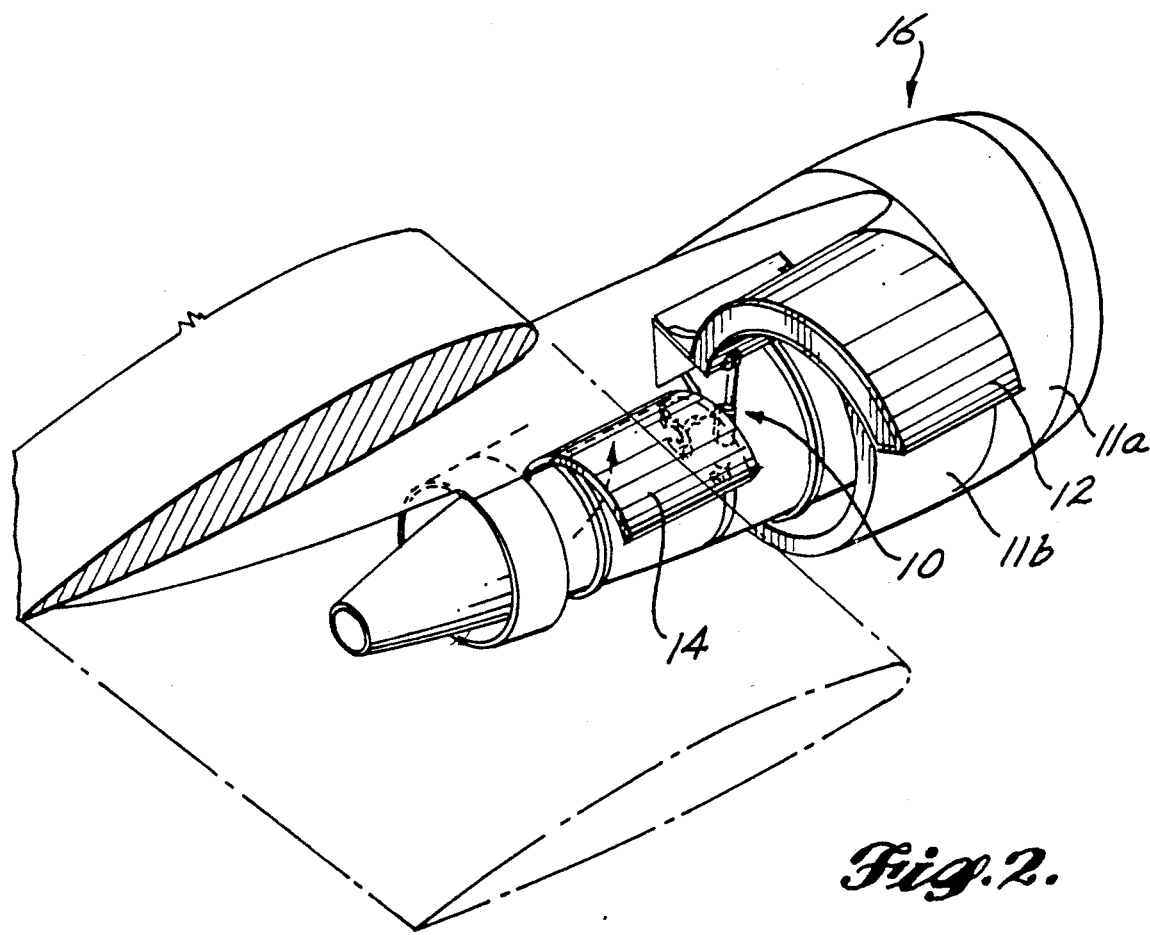
FIG. 2 is an isometric view of the aircraft engine cowling arrangement of FIG. 1 showing a cowling interlock system formed in accordance with the invention as applied to a thrust reverser cowling and an adjacent core cowling.

FIGS. 1 and 2 illustrate an aircraft engine cowling arrangement in which a cowling interlock system 10 formed in accordance with this invention is applied. The cowling arrangement includes an inlet cowling 11a, a fan cowling 11b, a thrust reverser cowling 12, and a core cowling 14. Both the thrust reverser cowling 12 and the core cowling 14 are movable between an open position, shown in FIG. 2, wherein the engine 16 and its components are exposed, and a closed position, wherein the engine 16 and its components are covered. As shown in FIG. 1, when in the closed position the thrust reverser cowling 12 overlaps the core cowling 14. This overlap can result in interference between the two cowlings if they are opened or closed in an improper sequence. To avoid interference, the thrust reverser cowling 12 must be opened before the core cowling 14 can be opened. Similarly, the core cowling 14 must be closed before the thrust reverser cowling 12 is closed. If this closing sequence is not followed, significant structural damage to the thrust reverser 12, the core cowling 14, and the core cowling hinge 18 (described below in conjunction with FIG. 3) can occur.

Figure 3:
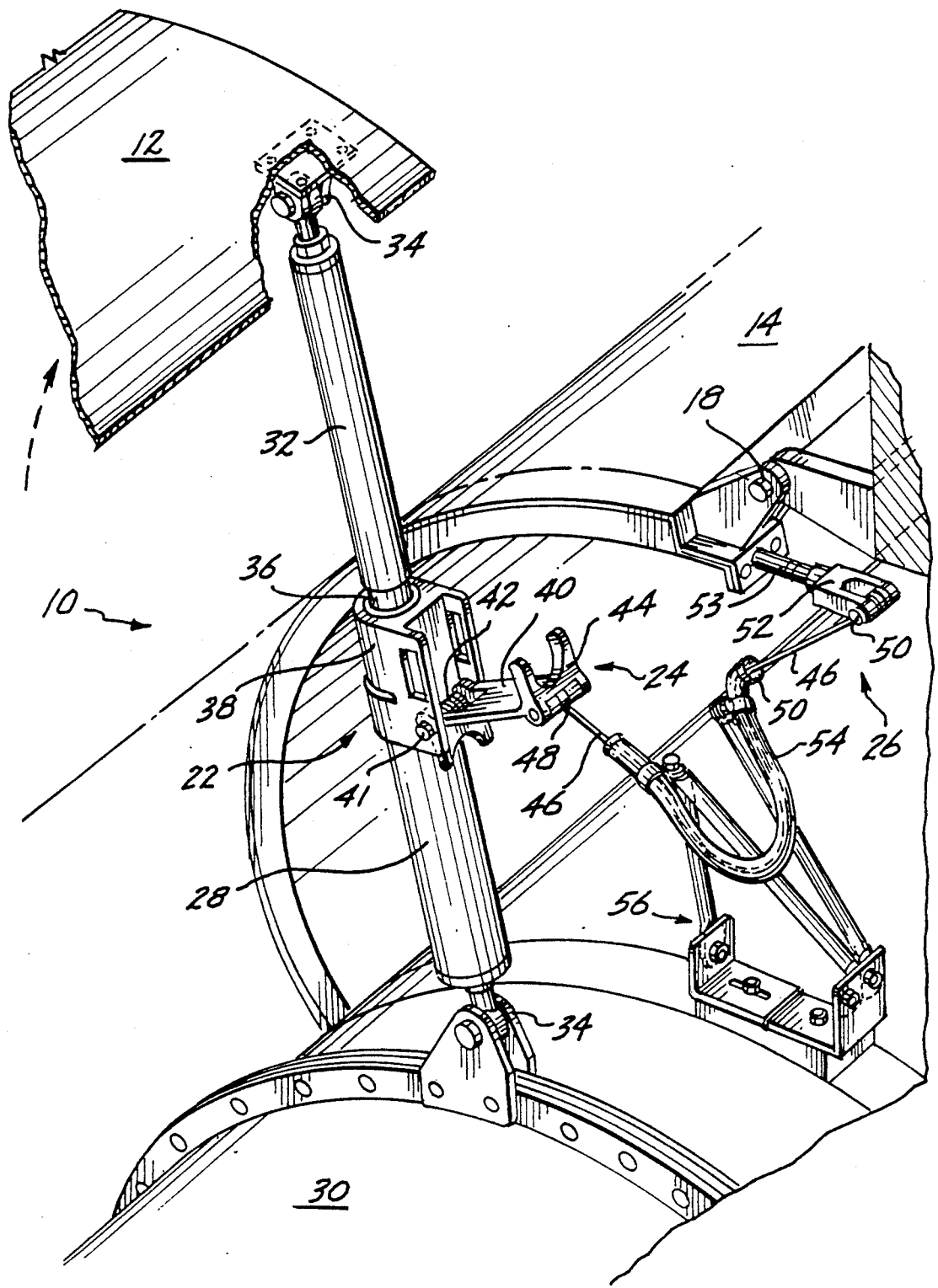
FIG. 3 is an enlarged, partial isometric view of the cowling interlock system of FIG. 2 illustrating the thrust reverser in the open position and the core cowling in the closed position.
Figure 4:
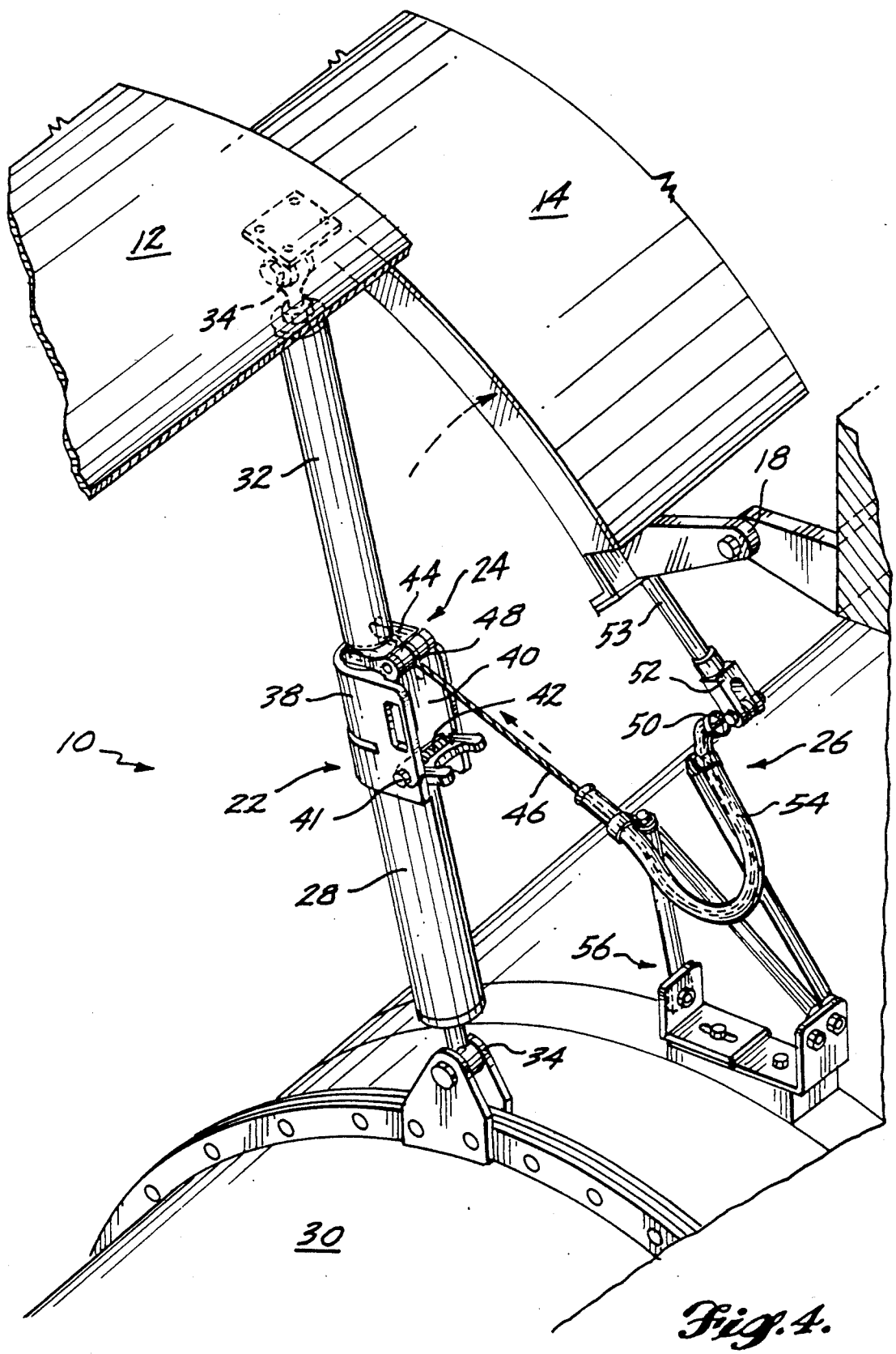
FIG. 4 is an enlarged, partial isometric view of the cowling interlock system of FIG. 2 illustrating the thrust reverser and the core cowling in the open position.

Referring next to FIGS. 3 and 4, the cowling interlock system 10 includes a telescoping rod 22 that holds the thrust reverser cowling 12 in the open position, a locking mechanism 24 that locks the telescoping rod 22 and the thrust reverser cowling 12 in the open position, and a connecting assembly 26 that connects the locking mechanism 24 to the core cowling 14.

The telescoping rod 22 is formed of an outer tubular member 28 and an inner tubular member 32. The outer tubular member 28 is connected at one end to the engine frame 30 with a double flange and pin assembly 34. The inner tubular member 32 has one end slidably mounted within the outer tubular member 28 and the other end connected to the thrust reverser cowling 12 with another double flange and pin assembly 34. While a double flange and pin assembly 34 is illustrated, the means of connection to the engine frame 30 and the thrust reverser cowling 12 can be any mounting device that allows the telescoping rod 22 to swivel as the thrust reverser cowling 12 is opened and closed. A primary advantage of such a double flange and pin assembly 34 is that it prevents rotation of the telescoping rod 22 about its longitudinal axis while allowing the appropriate opening and closing movement of the cowlings.

The telescoping rod 22 is operable between an extended configuration, wherein the inner tubular member 32 extends out of the outer tubular member 28, and a retracted configuration wherein the inner tubular member 32 is slid within the outer tubular member 28. The telescoping rod 22 is fluid filled, either pneumatically or hydraulically, to bear the weight of the thrust reverser cowling 12 and hold it in the open position. In the illustrated embodiment, the rod 22 does not serve as an actuator, but merely holds the cowling 12 open, although, if desired, an actuator could be substituted. The inner tubular member 32 of the telescoping rod 22 has a relieved portion 36 that is sized to be engaged by the locking mechanism 24. As more clearly shown in FIG. 3, the relieved portion 36 is located at the end of the inner tubular member 32 opposite the double flange and pin assembly 34, and is engagable only when the telescoping rod 22 is in its fully extended configuration.

The locking mechanism 24 is mounted on the telescoping rod 22 at the end of the outer tubular member 28 opposite the double flange and pin assembly 34 through the use of a mounting bracket 38. A latch 40 is mounted on the mounting bracket 38 to pivot about an axle pin 41 that is journaled in the mounting bracket 38. A helical torsion spring 42 positioned around the axle pin 41 urges the latch 40 into engagement with the relieved portion 36 of the inner tubular member 32 of the telescoping rod 22. The latch 40 has a forked end 44 that is sized to engage the relieved portion 36 on the inner tubular member 32. The forked end 44 is shaped to provide substantially continuous contact with approximately one-half the circumference of the circular surface of the relieved portion 36.

The connecting assembly 26 includes a cable 46 having a first end 48 attached to the latch 40 and a second end 50 attached to the core cowling 14. The second end 50 of the cable 46 is attached to the core cowling 14 through a clevis 52. The clevis 52 is mounted on the end of a rod 53 that extends the clevis 52 beyond the pivotal axis of the core cowling hinge 18 such that as the core cowling 14 swings upward and open the clevis 52 pivots downward to provide slack in the cable 46. The clevis 52 and rod 53 may be either structurally integral with or mounted on the core cowling hinge 18, or they may be mounted directly on the cowling 14. The cable 46 is of such a length that the latch 40 is pulled out of engagement with the relieved portion 36 of the telescoping rod 22 when the core cowling 14 is moved to the closed position (see FIG. 3). This length also allows the latch 40 to engage the relieved portion 36 of the telescoping rod 22 as slack is created in the cable 46 when the core cowling 14 is moved to the open position (see FIG. 4). As mentioned above, the biasing spring 42 provides the force required to move the latch 40 into engagement with the relieved portion 36 on the inner tubular member 32 when tension is relieved and the cable 46 is slackened. The cable 46 provides no pushing force on its own as, for instance, a Bowden cable does.

A guide tube 54 guides the movement of the cable 46, protects the cable 46 from wear (chafing, etc.), and keeps the cable 46 from becoming entangled in engine components. A support bracket 56 mounted to the engine frame 30 holds the guide tube 54 in place. The ends of the guide tube 54 are positioned to realign the axis of the cable 46 so that movement of the clevis 53 upward acts to pull the latch 40 out of engagement.

In operation, the overlapping thrust reverser cowling 12 is first opened, thereby moving the attached telescoping rod 22 from the retracted configuration to the extended configuration. Since the core cowling 14 is in the closed position, there is no slack in the cable 46. Thus, the latch 40 is held in a nonengaged position (see FIG. 3). As the core cowling 14 is moved to the open position, the clevis 52 pivots downward to release tension and slacken the cable 46. This allows the helical torsion spring 42 to urge the latch 40 into engagement with the relieved portion 36 on the telescoping rod 22, thereby locking the thrust reverser cowling 12 in the open position to prevent closing the thrust reverser cowling 12 while the core cowling 14 is in the open position (see FIG. 4). As the core cowling 14 is closed, the clevis 52 pivots upward to remove slack from the cable 46. The cable 46 pulls the latch 40 out of engagement with the relieved portion 36 of the telescoping rod 22 and unlocks the thrust reverser cowling 12 to allow closure.

While a preferred embodiment of the invention has been illustrated and described, it should be understood that variations can be made therein without departing from the spirit and scope of the invention. For example, the cowling interlock system 10 may be retrofitted to existing hold open rods. Additionally, the cowling interlock system 10 need not be restricted to the thrust reverser and the core cowling, but can be applied to any overlapping cowlings in a jet engine nacelle system. Accordingly, it is to be understood that the invention is not to be limited to the specific embodiment illustrated and described herein. Rather, the true scope and spirit of the invention is to be determined by reference to the following claims.

The embodiments of the invention in which an exclusive property or privilege is claimed are defined as follows:

1. An aircraft engine cowling interlock system for sequencing the closure of a first cowling and a second cowling disposed substantially forward and aft of each other, the first and second cowlings being mounted on the engine for movement between an open position and a closed position, with the first cowling overlapping the second cowling when both cowlings are in the closed position, the cowling interlock system comprising:

means for holding the first cowling in the open position, said holding means having a first end attached to the first cowling and a second end attached to the engine frame, said holding means having an extended configuration wherein the first cowling is held in the open position by said holding means and a retracted configuration wherein the first cowling is in the closed position;

means for locking said holding means in the extended configuration; and means for operatively connecting said locking means to the second cowling, such that when the second cowling is in the open position, said locking means locks said holding means in the extended configuration to prevent closure of the first cowling, and when the second cowling is in the closed position, said locking means unlocks said holding means to allow closure of the first cowling.

2. The system of claim 1, wherein said locking means comprises a latch engagable with said holding means to lock said holding means in the extended configuration.

3. The system of claim 2, wherein said connecting means comprises a cable, said cable having a first end attached to said latch and a second end attached to the second cowling.

4. The system of claim 3, further comprising means for biasing said latch into engagement with said holding means as the second cowling moves to the open position.

5. The system of claim 4, further comprising means for guiding said cable from the second cowling to said latch such that as the second cowling moves to the open position slack is provided in said cable to allow said latch to be biased into engagement with said holding means, and as the second cowling is moved to the closed position the second cowling pulls said cable to thereby pull said latch out of engagement with said holding means to unlock said holding means.

6. An aircraft engine cowling interlock system for sequencing the closure of a thrust reverser cowling and an adjacent core cowling, the thrust reverser cowling and the core cowling being mounted on the engine for movement between an open position and a closed position, with the thrust reverser cowling overlapping the core cowling when both cowlings are in the closed position, the cowling interlock system comprising:

a telescoping rod for holding the thrust reverser cowling in the open position, said telescoping rod having a first end attached to the thrust reverser cowling and a second end attached to the engine frame, said telescoping rod having an extended configuration wherein the thrust reverser cowling is held in the open position by said telescoping rod and a retracted configuration wherein the thrust reverser cowling is in the closed position;

a latch pivotally mounted on said telescoping rod for movement between an engaged position wherein said telescoping rod is locked in the extended configuration and a disengaged position wherein said telescoping rod is unlocked from the extended configuration; and, a connecting assembly for operatively connecting said latch to the core cowling such that as the core cowling moves to the open position said latch moves into the engaged position to lock said telescoping rod in the extended configuration to prevent closure of the thrust reverser cowling, and as the core cowling moves to the closed position said latch moves to the disengaged position to unlock said telescoping rod from the extended configuration to allow closure of the thrust reverser cowling.

7. The system of claim 6, wherein said telescoping rod comprises an outer tubular member connected to the engine frame and an inner tubular member slidably mounted within said outer tubular member and connected to the thrust reverser cowling, said inner tubular member having a relieved portion, and further wherein said latch has a forked portion sized to engage said relieved portion to lock said telescoping rod in the extended configuration.

8. The system of claim 7, wherein said latch further comprises means for urging said latch into the engaged position, and further wherein said connecting assembly comprises a cable and a guide tube, said cable having a first end attached to said latch and a second end attached to the core cowling, said guide tube being mounted to the engine to guide said cable from the core cowling to said latch and to permit said cable to slacken as the core cowling moves to the open position such that said latch is urged into the engaged position by said urging means.

9. An aircraft engine cowling interlock system for sequencing the closure of a first cowling and a second cowling disposed substantially forward and aft of each other, the first and second cowlings being mounted to the engine for movement between an open position and a closed position, and the first cowling overlapping the second cowling when both cowlings are in the closed position, the engine further including a support rod that supports the first cowling in the open position and a locking mechanism that engages the support rod to lock the support rod and the first cowling in the open position, the cowling interlock system comprising means for operatively connecting the locking mechanism to the second cowling, such that when the second cowling is in the open position the locking mechanism is engaged with the support rod to prevent closure of the first cowling, and when the second cowling is in the closed position the locking mechanism is disengaged from the support rod to allow closure of the first cowling.

* * * * *